July 15, 1958
W. R. WELCH
2,843,394
VEHICLE SUSPENSION MECHANISM
Filed Feb. 20, 1956
2 Sheets-Sheet 1
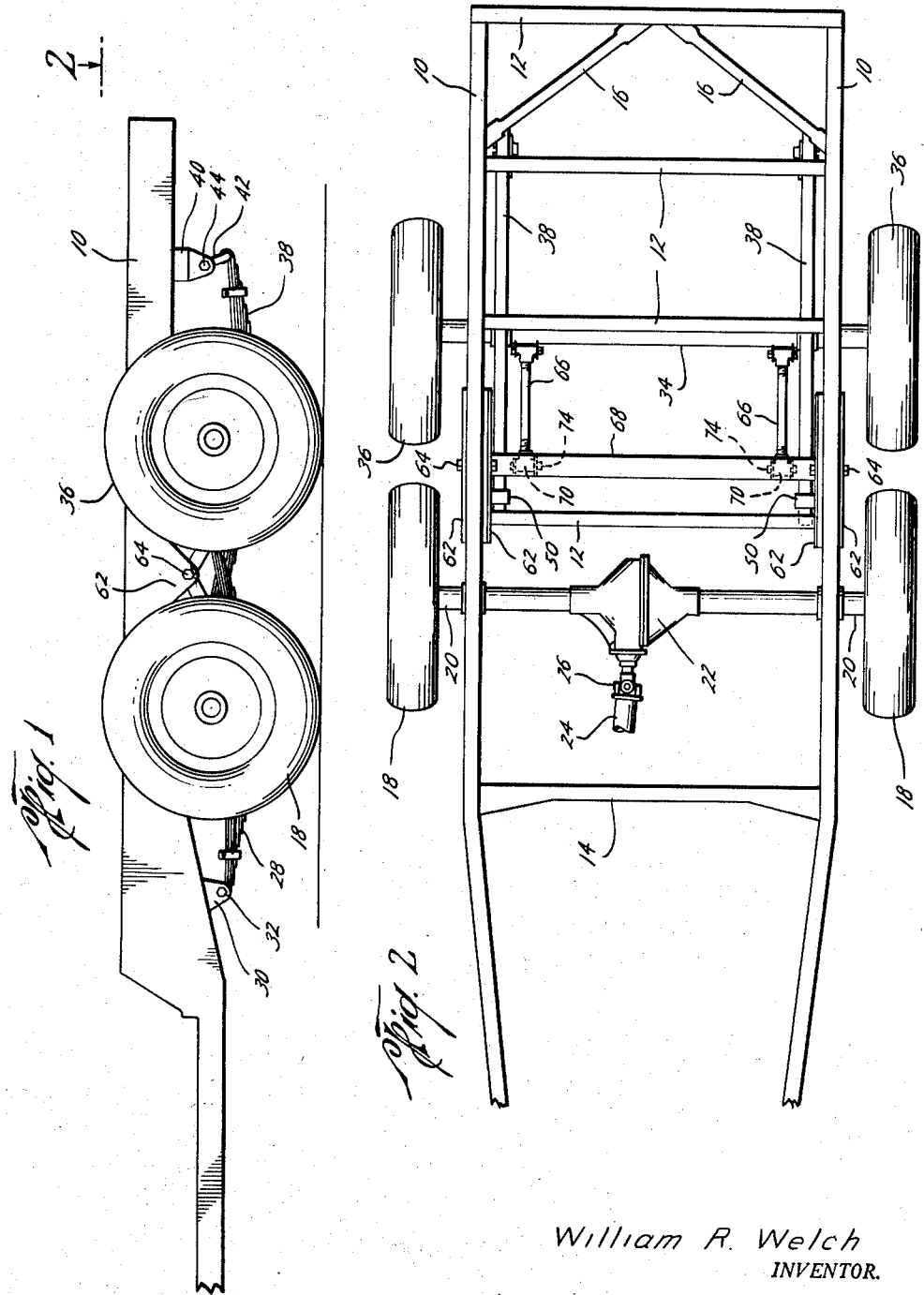
William R. Welch
INVENTOR.
BY Charles E. Lightfoot
ATTORNEY July 15, 1958 — W. R. WELCH — 2,843,394
VEHICLE SUSPENSION MECHANISM
Filed Feb. 20, 1956 — 2 Sheets-Sheet 2
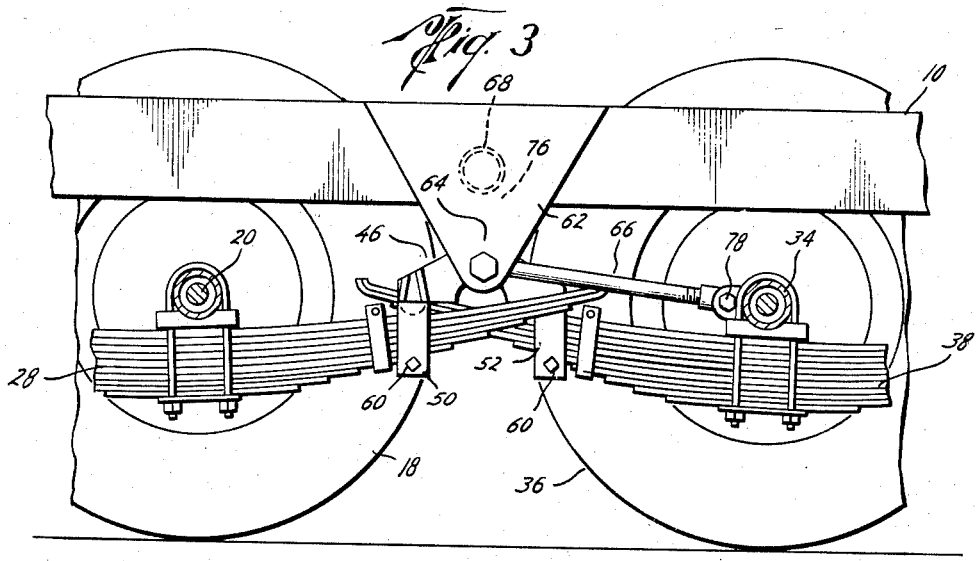
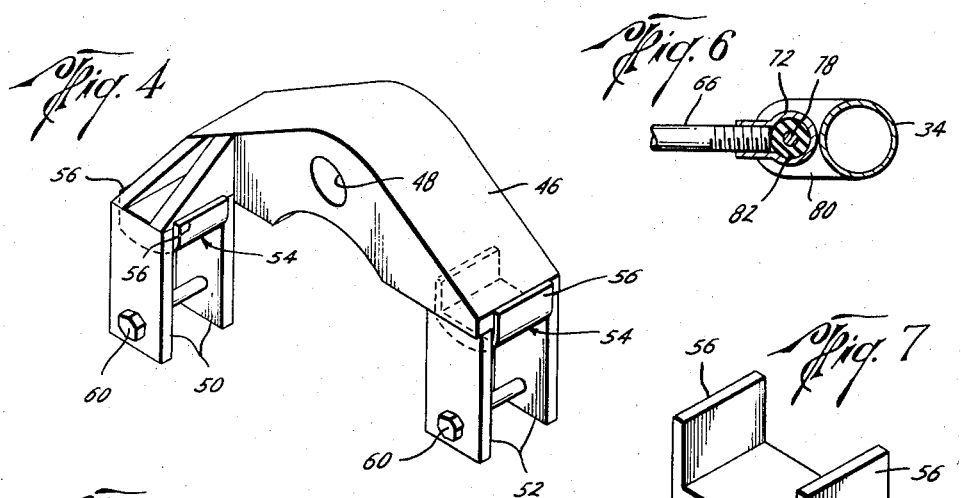
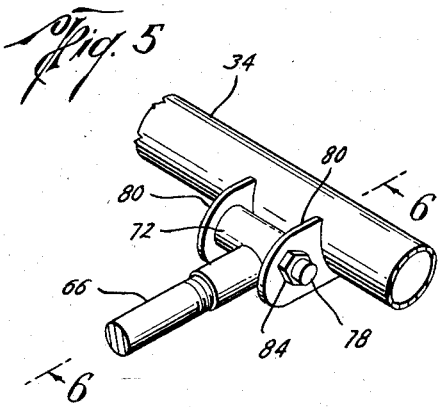
William R. Welch
INVENTOR.
BY Charles E. Lightfoot
ATTORNEY United States Patent Office 2,843,394
Patented July 15, 1958

2,843,394

VEHICLE SUSPENSION MECHANISM

William R. Welch, Houston, Tex., assignor to Koenig Iron Works, Inc., Houston, Tex., a corporation of Texas Application February 20, 1956, Serial No. 566,602

3 Claims. (Cl. 280—104.5)

This invention relates to vehicle suspension mechanism, and more particularly to auxiliary spring suspension mechanism for use in applying additional load supporting wheels to a vehicle whereby the same may be adapted to carry an increased load.

The invention has for an important object the provision of means for applying additional wheels to a vehicle in tandem arrangement with the rear wheels of the same, whereby the load carrying capacity of the vehicle may be greatly increased.

Another object of the invention is to provide vehicle suspension mechanism including an auxiliary wheel and axle assembly and means for attaching the same to a vehicle frame with the wheels of the assembly in tandem arrangement with the rear wheels of the vehicle, whereby the vehicle may be readily converted without substantial alteration of its structure to carry an increased load.

A further object of the invention is the provision of vehicle suspension mechanism embodying auxiliary wheels positioned in tandem or in line arrangement with the rear wheels of a vehicle and including means whereby the auxiliary wheels may have limited angular movement relative to said rear wheels to permit the auxiliary wheels to adjust themselves relative to said rear wheels when the vehicle travels about a curve.

Another object of the invention is to provide suspension mechanism embodying an auxiliary wheel and axle assembly and including means for connecting the assembly to a vehicle with the auxiliary wheels arranged in tandem relation to the rear wheels of a vehicle to permit independent vertical movement of said rear wheels and said auxiliary wheels relative to each other.

A further object of the invention is the provision in a vehicle suspension mechanism having auxiliary wheels arranged in tandem relation to the rear wheels of a vehicle, of means for causing the load to be maintained in a uniformly distributed condition on all of the wheels when the vehicle moves over rough or uneven ground.

Another object of the invention is to provide an auxiliary wheel and axle assembly for application to a vehicle and having suspension springs which are the same as the springs of the rear wheels of the vehicle and including means for interconnecting the springs to permit independent vertical movement of all of the wheels whereby the load supported by each of the wheels will be substantially equal in all positions of the wheels.

A further object of the invention is the provision of vehicle suspension mechanism having auxiliary wheels and adapted to be attached to a vehicle with the auxiliary wheels in tandem arrangement with the rear wheels of the vehicle, and auxiliary leaf springs of the same construction as the springs of said rear wheels, and including means for interconnecting said auxiliary and rear wheel springs in a manner to cause the load on the vehicle to be substantially equally distributed on all of the wheels regardless of the relative vertical positions of the wheels.

A still further object of the invention is to provide vehicle suspension mechanism embodying an auxiliary wheel and axle assembly for attachment to a vehicle frame and which is of simple design and rugged construction, which may be economically manufactured and easily applied to or removed from a vehicle, and which is capable of withstanding the extreme conditions of wear and hard usage to which structures of this kind are likely to be subjected.

The above and other important objects and advantages of the invention will best be understood from the following detailed description, constituting a specification of the same when considered in conjunction with the annexed drawings, wherein—

Figure 1 is a fragmentary side elevational view on a somewhat reduced scale of a vehicle frame, showing the suspension mechanism of the invention applied thereto;

Figure 2 is a top plan view of the invention as illustrated in Figure 1;

Figure 3 is a fragmentary, longitudinal, cross-sectional view, showing details of construction and arrangement of the suspension mechanism of the invention;

Figure 4 is a perspective view, of the spring rocker member of the spring assembly of the invention;

Figure 5 is a fragmentary perspective view of a portion of the tie-rod means of the invention;

Figure 6 is a cross-sectional view, taken along the line 6—6 of Figure 5 looking in the direction indicated by the arrows; and Figure 7 is a perspective view, on a somewhat enlarged scale, of one embodiment of a spring bearing plate of the invention.

Referring now to the drawings in greater detail, the invention is disclosed herein in connection with its application to an automobile truck of conventional design, it being understood that the invention is not limited to such use, but is capable of application to vehicles of numerous different types wherein it may be desired to provide extra wheels together with spring suspension means therefor to increase the load capacity of the vehicle. In the drawings, there is shown the rear end portion of the frame of a vehicle, such as an automobile truck of conventional construction, having spaced apart longitudinal frame elements 10, which may be connected together at various points by cross pieces, such as those indicated at 12 and 14, and which may also be provided with braces, such as the diagonal braces 16. The frame elements 10, 12, 14 and 16 may be of any desired shape in cross section, such as channels, arranged and secured together in any desired manner, to provide a frame of usual construction.

Vehicles of this type are customarily provided with rear wheels, such as those indicated at 18, mounted on suitable axles 20 arranged to be rotated by differential mechanism 22, which is operated through the intermediation of the usual drive shaft 24 suitably connected to such mechanism as by means of the universal joint 26.

Each of the axles 20 is supported on a spring 28, which may be of the conventional leaf type, and which is connected at one end to one of the frame members 10 by means of conventional spring shackle means including spaced apart lugs 30 depending from the frame member, and to which the uppermost leaf of the spring is pivotally secured, as by means of a bolt 32, passing through aligned perforations in the lugs. As ordinarily constructed the spring suspension mechanism for the rear wheels 18 also includes shackle means, not shown, similar to that just described, by which the other end of each spring is connected to the frame. It will be apparent that the load carrying capacity of the vehicle constructed in this manner is limited, and it is the chief purpose of the present invention to provide means, employing additional springs of the same kind and without substantially altering the structure of the frame, whereby the load capacity of the vehicle may be greatly augmented.

In the present illustration a non-driven or dead supplemental axle 34 is provided, which is positioned in longitudinally spaced relation to the driven axles 20, and upon which auxiliary or idler wheels 36 are rotatably mounted, in tandem relation to the driving wheels 18. The axle 34 is mounted on springs 38, which are of identical construction to the springs 28 upon which the driven axles 20 are mounted, the springs 38 being arranged in laterally offset relation to the springs 28. Each of the springs 38 is pivotally connected at one end to the frame by shackle means, including depending lugs 40, similar to the lugs 30, previously described, to which a link 42 is pivotally secured at one end, as by means of a bolt 44, extending through aligned openings in the lugs, the link being conected at its other end to the end of the spring.

A rocker element 46 is provided to support the ends of the springs 28 and 38 opposite the ends which are connected to the lugs 30 and 40, which rocker element may take the form of a metal casting having a central opening 48, and downwardly extending pairs of laterally spaced plate-like portions 50 and 52 at its opposite ends, the portions 50 being laterally offset relative to the portions 52. The rocker element 46 is preferably of hollow construction, formed to permit the application thereto of spring bearing elements 54, of generally U-shape, fitted between the pairs of plate-like portions 50 and 52 with the arms 56 of the U extending upwardly, in position for engagement with the rocker member, to hold the bearing elements against longitudinal movement relative to the rocker member. The bottom of each of the spring elements 54 is preferably formed with a rounded external surface 58, positioned to be engaged by the upper plate of one of the springs. Retainer means, such as the bolts 60 are provided, extending through aligned perforations in the pairs of plate-like portions 50 and 52, at locations spaced beneath the rounded bottom surfaces 58 of the spring bearing elements 54, in position to be engaged by the springs, to limit downward movement of the springs in the rocker member.

Suitable means is provided, such as spaced apart plates 62, attached to the frame elements 10 and extending downwardly therefrom between the axles 20 and axle 34, for supporting the rocker members 46 on the frame, said plates 62 having aligned openings therethrough through which bolts 64 may be extended, which bolts also pass through the openings 48 of the rocker members to pivotally connect the rockers to the frame.

As best seen in Figure 3 of the drawings the inner ends of the springs 28 and 38, which are the ends opposite the ends of the springs supported on the lugs 30 and 34, are extended between the pairs of plate-like portions 50 and 52, the inner end of the spring 28 being extended between the plate-like portions 52, and the inner end of the spring 38 being extended between the plate-like portions 50, so that the upper leaves of the springs may bear against the rounded bottom surfaces of the spring bearing elements 54. By this arrangement the axles 20 and 34 may have independent vertical movement, the inner ends of the springs being slidable in the rocker member to adjust for flexing of the springs during such movement. Moreover, because of the pivotal connection of the rocker members with the frame, the rocker members may swing vertically about the bolts 64, upon vertical movement of the wheels 18 and 36, relative to each other, so that the load borne by each of the wheels will be substantially the same, regardless of the relative vertical portions of the same.

The dead axle 34 is also connected to the frame by means of links 66, each of which has tubular T-shaped connector members 70 and 72 at its opposite ends. At one end of each link the connector member 70 is pivotally connected to a cross member 68 of the frame, by a bolt 74, extending through aligned perforations in a pair of lugs 76 on the cross member. At its other end, each of the links is connected to the axle 34 by a flexible connection, comprising a bolt 78, extending through aligned perforations in a pair of lugs 80 on the axle, and through the connector member 72, which is positioned between the lugs 80, and within which a resilient tubular element 82 is fitted about the bolt 78. By this arrangement the axle 34 may swing vertically relative to the frame, and because of the flexible connections between the link 66 and the axle 34, the axle may also have limited angular movement relative to the frame, whereby the auxiliary wheels 36 may have angular movement relative to the wheels 18 when the vehicle moves about a curve, thus relieving the strain on the wheels and the wear on the tires.

I claim:

1. In a vehicle having a frame, axles extending laterally of the frame in longitudinally spaced relation to each other for vertical movement relative to the frame, suspension mechanism comprising leaf springs at each side of the frame, means connecting each spring at a point intermediate its ends to one of said axles, the springs of one axle being offset laterally of the frame relative to the springs of the other axle, means connecting one end of each spring to the frame at a point spaced longitudinally from the axles, an elongated rocker pivotally connected mediate its ends to the frame above the springs at each side of the frame between the axles for vertical swinging movement and having longitudinaly spaced plate-like portions, each pair of which is positioned to receive between the plate-like portions one of said springs, and spring bearing elements of U-shape removably mounted on the rockers positioned above the springs and formed with downwardly facing curved bearing surfaces positioned for engagement with the springs at points on the springs between the other ends of the springs and said intermediate points to transmit vertical forces from said axles to said rockers and side wall portions positioned for engagement with the rockers to hold the elements against longitudinal movement relative to the rockers.

2. In a vehicle having a frame, axles extending laterally of the frame in longitudinally spaced relation to each other for vertical movement relative to the frame, suspension mechanism comprising elliptical springs at each side of the frame, means connecting each spring at a point intermediate its ends to one of said axles, the springs of one axle being offset laterally of the frame relative to the springs of the other axle, means connecting one end of each spring to the frame at a point spaced longitudinally from the axles, an elongated rocker pivotally conected mediate its ends to the frame between the axles for vertical swinging movement and having longitudinally spaced, downwardly extending, laterally offset, pairs of laterally spaced plate-like portions each pair of which is positioned to receive between the plate-like portions one of said springs and spring bearing elements of U-shape removably positioned on said rockers located between each of said pairs and formed with a downwardly facing curved surface positioned for engagement with one of the springs at a point between the other end of the spring and said intermediate point to transmit vertical forces of the axles to the rockers.

3. In a vehicle having a frame, axles extending laterally of the frame in longitudinally spaced relation to each other for vertical movement relative to the frame, suspension mechanism comprising elliptical springs at each side of the frame, means connecting each spring at a point intermediate its ends to one of said axles, the springs of one axle being offset laterally of the frame relative to the springs of the other axle, means connecting one end of each spring to the frame at a point spaced longitudinally from the axles, an elongated rocker pivotally connected mediate its ends to the frame above the springs at each side of the frame between the axles for vertical swinging movement and having longitudinally spaced, downwardly extending, laterally offset pairs of laterally spaced portions each pair of which is positioned to receive between the portions one of said springs, spring bearing elements of U-shape removably mounted on the rockers positioned between the portions of said pairs and formed with downwardly facing curved bottom surfaces positioned for sliding engagement with springs at points between the other ends of the springs and said intermediate points to transmit vertical forces from the axles to the rockers and whose side walls are positioned for engagement with the rockers to hold the elements against longitudinal movement relative to the rockers and means on the rockers positioned for engagement with the springs to hold the springs against disengagement from said surfaces.

References Cited in the file of this patent

UNITED STATES PATENTS 2,653,035     Ward _____ Sept. 22, 1953

FOREIGN PATENTS 276,476     Great Britain _____ Sept. 1, 1927